Aug. 29, 1939.   H. KREIDEL   2,171,217
METAL PACKING RING FOR USE WITH SCREWED PIPE JOINTS OR COUPLINGS
Filed Aug. 17, 1937

Inventor:
Hans Kreidel,
by Cooper, Kerr & Dunham
Attorneys.

UNITED STATES PATENT OFFICE 2,171,217

METAL PACKING RING FOR USE WITH SCREWED PIPE JOINTS OR COUPLINGS

Hans Kreidel, Wiesbaden, Germany

Application August 17, 1937, Serial No. 159,448
In Germany November 11, 1936

3 Claims. (Cl. 285—122)

This invention relates to improved metal packing rings for use with screwed pipe joints or couplings of the general type shown and described in my United States Patent No. 2,139,413, dated December 6, 1938, and in my copending application Serial No. 126,751, filed February 20, 1937.

The couplings or screwed pipe joints described in the foregoing applications included a metal packing ring provided with one or more successive annular edges which ring, during the tightening up of the screwed joint by suitable tightening means, was displaced axially upon a stationary pipe and which ring was guided and contracted by its front part cooperating inside of a funnel shaped connecting part so that the annular cutting edge or edges cuts or gouges into the tube, pipe, shell or casing. This action during the further forward pushing of the ring upon the tightening of the joint creates one or more successive tight packing seals by forming one or more successive ridges of tube material which are raised up to protrude beyond the normal outer diameter of the tube.

In order to effectively and efficiently provide for the desired cutting effect and to provide a desired tight joint various factors have to be taken into account. First there should be a suitable guiding angle for the funnel shaped tube connecting part; second, the cutting edge of the sharp cutting edge or edges should be correctly selected; third, the ring should also itself be of sufficient hardness and of suitable material to provide for the formation of the packing ring or seal upon the tube; fourth, it is desirable that all detrimental or excessive friction be reduced to a minimum during the tightening of the joint in order that the actual force required for tightening may be minimized and in order that the force may be transmitted with as little loss as possible to the sharp cutting edge or edges of the packing ring and finally the construction should be such which in all cases will permit of cutting sufficiently deeply into the pipe or tube casing with a desired minimum or normal expenditure of force.

The tubes which are connected together or connected to tanks and the like which are employed with screw joints or couplings of the foregoing type are generally produced by drawing processes and during drawing such tubes receive a material densification and/or hardening of their surfaces which surface conditions offer considerable resistance to the cutting in of a packing ring. Drawn copper tubes, for example, become so hard that packing rings of commercial brass in spite of the fact that this material is harder than copper are not usually capable of cutting into the tube casing to the degree and extent desired. Accordingly, packing rings of special brass have frequently been used and such rings are usually costly, particularly if produced from tubular material.

While the selection of a suitable raw material for packing rings for copper tubes presents considerable difficulties, difficulties are increased when steel tubes are used. A packing ring that can cut into the outer casing of a drawn steel tube requires a raw material for the ring, at least equivalent to chrome nickel steel. Not counting the difficulty of obtaining such raw material in tubular form, a finished packing ring of this material would set up so much resistance to its necessary deformation during the tightening of the nut that the guidance and contraction of the cutting edge at or adjacent such edge and at or adjacent the front part of the ring would present a considerable problem.

The present invention relates to and has for its object the provision of an improved ring which will obviate many, if not all, of the difficulties heretofore experienced with rings as heretofore employed in couplings of the class referred to.

A further object of the present invention resides in the provision of an improved method for making metallic packing rings.

A further object of the present invention resides in the provision of a packing ring which is relatively cheap and inexpensive to manufacture and one which is well adapted for use in couplings of this class.

A further object of the present invention resides in the provision of a metal packing ring which includes hardened surface portions, at least in the portions, in proximity to the cutting edge and which in other portions is capable of ready deformation without the expenditure of undue force.

A further object of the present invention resides in the provision of an improved packing ring provided with a surface coating for reducing friction at points on the ring where such friction should be reduced to thereby facilitate the making up of a coupling.

Further and other objects of the present invention will be hereinafter set forth in the accompanying specification and claims and shown in the drawing which shows by way of illustration a preferred embodiment and the principle thereof and what I now consider to be the best mode in which I have contemplated of applying that principle. Other embodiments of the invention employing the same or equivalent principle may be used and structural changes made as desired by those skilled in the art without departing from the present invention and within the spirit of the appended claims.

In the drawing, two embodiments of the invention are shown and in each a packing ring is provided with only one cutting edge for purposes of illustration.

Figure 1:
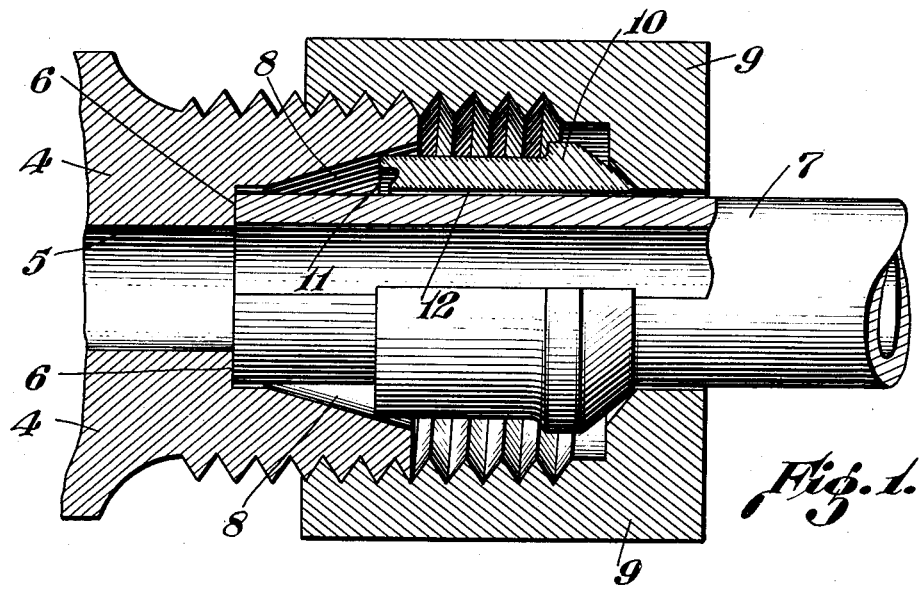
Figure 1 shows a complete screwed joint or coupling for tubes in its untightened set with a surface hardened packing ring shown partially in longitudinal section.
Figure 2:
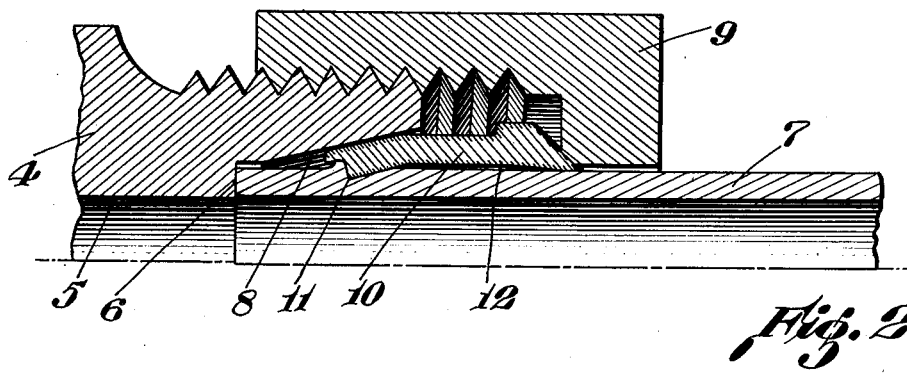
Fig. 2 shows the upper half of a tightened up joint with the packing ring cutting into the tube casing and shown in section.
Figure 3:
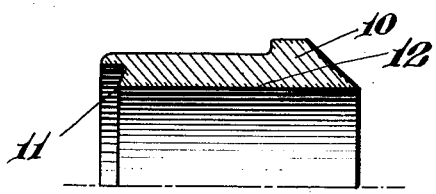
Fig. 3 shows the upper half of a surface hardened packing ring of low carbon steel and cross-section and shows the surface hardened layer ground away from portions of the cylindrical casing and with a hardness layer also ground away from the slightly grounded outer edge.

In accordance with the present invention the packing ring itself is made of deformable and relatively low carbon steel. The ring is first completely machined to accurate size and shape. Thereafter the ring is surface hardened or case hardened. The surface hardened layer is preferably as thin as possible. The thickness depends somewhat upon the diameter of the ring. A thickness of a few hundreds of a millimeter have been found suitable for rings having a diameter of about twenty millimeters. To provide the surface hardening, or case hardening, the ring may be advantageously dipped into a molten potassium cyanide bath and thereafter quenched in cold water. Surface hardening of objects by cyanide potassium processes are per se still known in the art.

The time of insertion of the ring in the bath and the temperature of the bath are regulated in accordance with the thickness desired for the hardened surface layer. Packing rings so made and thus treated remain soft in the core portions and do not offer too great resistance to deformation when being applied to tubes in coupling applications. Such packing rings of low carbon steel with surface hardening can, because of their deformability characteristics, be used for all tubes, for example, tubes of steel, copper and/or like materials. Commercial gas tubes and tubes for water tubes for boilers of low carbon steel, may be used as raw material for the production of the packing rings and the material of such tubes is particularly well adapted for surface hardening or case hardening. In view of the fact that there is generally no tubing in commercial use with surfaces harder than the cutting edge or edges of the hardened steel packing ring, it is unnecessary to use for certain tubes different ring materials specially selected for the tube with which they are to be used whereby advantages are obtained as regards minimizing of costs and a desired positiveness of operation of the rings in screwed joints and couplings.

Surface hardened packing rings of low carbon steel during the tightening up of the screwed joint are forced with considerable pressure against the funnel shaped guide wall of the tube connecting part and might, in the event that this funnel shaped part is of relatively soft material, readily get jammed at this point. This difficulty may be obviated by removing the surface hardening from that part of the packing ring which, during the tightening up of the screwed joint, comes in contact with the funnel shaped extension of the connecting piece. Surface hardening at such point or zone may be removed by being ground off mechanically or in lieu thereof there can be no surface hardening provided at this point initially during the surface hardening by providing a protective coating at such zone which will prevent case or surface hardening of the material at such zone.

The incising or cutting action of the surface hardened packing ring of low carbon steel is promoted if such ring is provided on its friction surface with a coating that improves the sliding characteristics during the tightening up, that is, during the guidance at the wall of the funnel shaped extension of the tube connection part. Oil fulfills this friction reducing purpose to a limiting extent only because the oil film is readily destroyed by the high pressure exerted by the front part of the packing ring against the funnel shaped extension of the tube connecting part. This drawback attendant upon use of a surface hardened packing ring of low carbon steel is avoided if the ring is provided with an outer thin cadmium coating. In addition to providing desired free sliding characteristics at the point of sliding contact between the ring and the funnel shaped extension this light and relatively thin cadmium coating also affords protection to the packing ring against deterioration due to corrosion both during storage and after installation of the ring in a coupling. In practice the cadmium coating may be plated over the entire surface of the ring, and during installation the sharp hard cutting edge 11 readily cuts through such thin cadmium coating.

Referring now in detail to the drawing, the illustrated jointed tube or coupling comprises a tube connecting part or support 4 which may also form part of a machine or apparatus, a packing ring 10 and a tightening means, for example an outer nut 9, which may be screwed down on the external threads of the tube connecting part or support. The passageway 5 in the tube connecting part or support forms a step-like setback or shoulder 6 forming an abutment or stop for the end face of the tube 7. The tube connecting part also has a funnel shaped elongation 8. The nut 9 serves as a tightening means having internal threads which may be screwed onto the external threads of the tube connecting part. The packing ring 10 is axially displaceable on the tube 7 and its front edge 11 is formed as a sharp cutting edge as previously stated.

According to the present invention, such packing ring is made of low carbon steel and is provided with a surface hardening layer. The relatively soft core is coated with a thin hard layer 12 which, in the drawing, is shown at the closer cross-hatching. Upon tightening up of the outer nut 9 the packing ring is moved forward axially upon the tube, which tube abuts at its end face against the recess or abutment 6 of the connecting part and the packing ring is somewhat contracted at the front cylindrical portion that slides against the wall of the funnel shaped enlargement of the tube connecting part 4. The front hard and sharp inner edge 11 thereupon cuts into the tube material and during further tightening of the outer nut throws up the cut material of the tube, which it pushes in front of it into a continuous annular ridge protruding from the tube casing 12. As previously explained, the layer 12 is relatively thin and the packing ring remains soft in its core so that the ring has sufficient deformability characteristics so as to be capable of being guided against the tube without the expenditure of too great tightening up force. The thin hard surface layer gives the packing ring and its cutting edge the necessary rigidity that finally makes it possible with only a slight contraction of the front part of the ring to effect the desired cutting into the tube.

As previously explained the simplest method of manufacture is to surface harden the rings by insertion into the potassium cyanide bath with subsequent quenching in cold water. If desired, portions of the hardened surface layer which come into contact with the tube connecting part may be removed at the places where such portions come into contact with the tube connecting part. Such removal of the hardened surface layer at this point or zone is particularly advantageous in the event that the tube connecting part is of relatively soft material. By removing the surface layer at such zone, the difficulty is obviated of the packing ring because of its great hardness jamming with its guiding edge in the funnel shaped tube connecting part or support. In lieu of subsequently removing the thin layer at such zone by a grinding operation the hardened layer may be kept from forming at this point during the case hardening step by providing a suitable protective coating which will prevent hardening at such zone during the hardening step.

It may also be desirable to provide the packing ring with a thin coating of sliding material, for example, cadmium and such cadmium may be applied by plating. The provision of a cadmium coating improves the sliding properties during the tightening up operation and furthermore protects the packing ring against corrosion. The cadmium coating may cover the entire ring.

What I claim is:

1. A metal packing ring for use with tube couplings of the type described, comprising a body portion of low carbon steel, providing a relatively soft core and affording deformability to the portions of the ring which are to yield and be contracted radially to an inner diameter smaller than the outer diameter of the cooperating tube, said packing ring of low carbon steel having a hardened surface portion to provide cutting edge portions of hard, strong and sharp characteristics so as to readily cut into the surface of a cooperating tube.

2. A metallic packing ring according to claim 1, including a thin overlying coating of metal affording free sliding characteristics at points where such free sliding is desired.

3. A metallic packing ring according to claim 1 with said packing ring having outer thin surfaces of cadmium affording free sliding characteristics to portions of the ring where free sliding is desired.

HANS KREIDEL.